United States Patent [19]
Ely et al.

[11] Patent Number: 5,972,230
[45] Date of Patent: Oct. 26, 1999

[54] METHOD FOR REJUVENATION OF FILTER ELEMENTS USED IN THE FILTRATION OF METALWORKING FLUIDS

[75] Inventors: W. Bruce Ely, Spokane; Bill G. Poynor, Mead, both of Wash.

[73] Assignee: Kaiser Aluminum and Chemical Corporation, Pleasanton, Calif.

[21] Appl. No.: 09/094,703

[22] Filed: Jun. 15, 1998

Related U.S. Application Data

[60] Provisional application No. 60/056,235, Aug. 28, 1997.
[51] Int. Cl.$^6$ ................................................. B01D 29/62
[52] U.S. Cl. ....................... 210/797; 134/22.16; 134/22.18
[58] Field of Search ................................. 210/791, 797, 210/798; 134/22.1, 22.11, 22.12, 22.13, 22.16, 22.18

[56] References Cited

U.S. PATENT DOCUMENTS

| 4,493,756 | 1/1985 | Degen et al. . |
| 5,487,836 | 1/1996 | Mason et al. ............................ 210/791 |

*Primary Examiner*—Robert J. Popovics
*Attorney, Agent, or Firm*—Philip L. McGarrigle

[57] ABSTRACT

Fines, that are present in lubricating oil, and their organo-metallic coatings are contacted with aqueous solutions of strong acids to solve the problems of plugged cartridge type filters. The present process employs a washing step whereby, following a filter cycle that is terminated due to a pressure build-up, a hot aqueous solution of a strong acid with a pH of approximately 1.5, is circulated through the plugged filter cartridges until the fines and organo-metallic coatings are solubilized. The acid wash solution is kept separate from the filter feedstock and filtrate by suitable valving, piping and tankage so as not to contaminate it. The filter cartridges may be rinsed prior to reintroduction of the feed stock to begin the next filter cycle.

18 Claims, 1 Drawing Sheet

ന്ന5,972,230

METHOD FOR REJUVENATION OF FILTER ELEMENTS USED IN THE FILTRATION OF METALWORKING FLUIDS

This application is a continuation-in-part of provisional application no. 60/056,235, filed Aug. 28, 1997, which is hereby incorporated by reference in its entirety.

FIELD OF THE INVENTION

This invention pertains to a system and process for removing contaminants from a fluid environment. More particularly, this invention relates to a fluid clarification system and process for the rejuvenation of the filter elements used in the system.

BACKGROUND OF THE INVENTION

In the hot- and cold-rolling of aluminum and other metals, asperities of the workpiece and the rolls are broken off from the matrix due to the ploughing that occurs in the roll bite as the hard steel rolls exert a high shearing force when they traverse the softer metal in the roll bite. These broken off pieces of roll and strip asperities are termed wear debris or "fines". In practice some of the fines remain on the strip as it exits the roll bite while others are washed off into the coolant used to control the roll temperature and roll-bite friction in the rolling process. Because of the large surface area of rolled metal and the large number of asperities found on that area, the amount of fines produced soon turns the coolant black in color and if not removed, could lead to operational problems with the coolant and surface quality problems with the metal being rolled. It is thus necessary to remove the fines to a reasonably low level.

Historically, filtration employing filter aids has been used in the metal rolling industry to accomplish the removal of fines. In the case of rolling mills using water-based fluids, however, because of the chemicals typically used in the oil composition, the fines are coated with a sticky organometallic layer that makes filtration through filter aids very difficult. Under the premise that backwashing of filter cartridges employed in filters filtering rolling mill coolant could remove the sticky fines, we attempted to use backwashable filter cartridges to remove the fines. We found that the backwashing of such cartridges was not able to remove the sticky fines from the fibers of the cartridges under normal backwash pressures and the cartridges became plugged. As a result, the filter cycles soon became impracticably short.

Accordingly, there is a need to provide a process by which a filter, which is clogged by the fines obtained by the filtration of lubricating oils, can be regenerated. Once regenerated, the filter will have the performance equivalent to a new filter, at low cost and with no waste liquid disposal problems.

SUMMARY OF THE INVENTION

The present invention is a process for rejuvenating filters. It comprises a process for improving the flow through of filter elements that are used to filter aluminum rolling oil and have been contaminated with aluminum fines that are complexed with soaps, the process comprises, heating an acid wash solution to a temperature between 100 and 200° F.; pumping the hot acid wash solution through the filter elements for at least 10 minutes. The preferred pH is between 1 and 2, or most preferably about 1.5. The acid solution is preferably heated to between 125 and 200° F., most preferably between 150° F. and 200° F.

Among other factors, it has been discovered that the present invention enables the filtration of lubricating oils, specifically aluminum rolling oils, in a commercially practical way. Specifically, filtration of fines from these fluids can unacceptably clog the filters within minutes, whereas they last for an economically practical length of time with the present rejuvenation process. An additional advantage to the present process is that there is less liquid waste to dispose.

More specifically, the present invention is a process for improving the flow through of filter elements, having pores of about 40 micrometers or less, the filter elements are used to filter aluminum rolling oil, and have been contaminated with aluminum fines that are complexed with soaps, the process comprises, shutting off the filter elements from the normal flow path of rolling oil and proving fluid communication with an acid wash solution having a pH of between 0.5 to 2.5, the acid wash solution containing one or more of the following acids selected from the group consisting of sulfuric, hydrochloric, nitric, acetic, citric, hydroflouric, hydrobromic, and phosphoric acids; heating the acid wash solution to a temperature between 125 and 200° F.; pumping the hot acid wash solution through the filter elements for at least 30 minutes; ceasing the contact and shutting off fluid communication between the acid wash solution and the filter elements; and reestablishing fluid communication between the filter elements and the rolling oil.

DETAILED DESCRIPTION OF THE INVENTION

Figure 1:
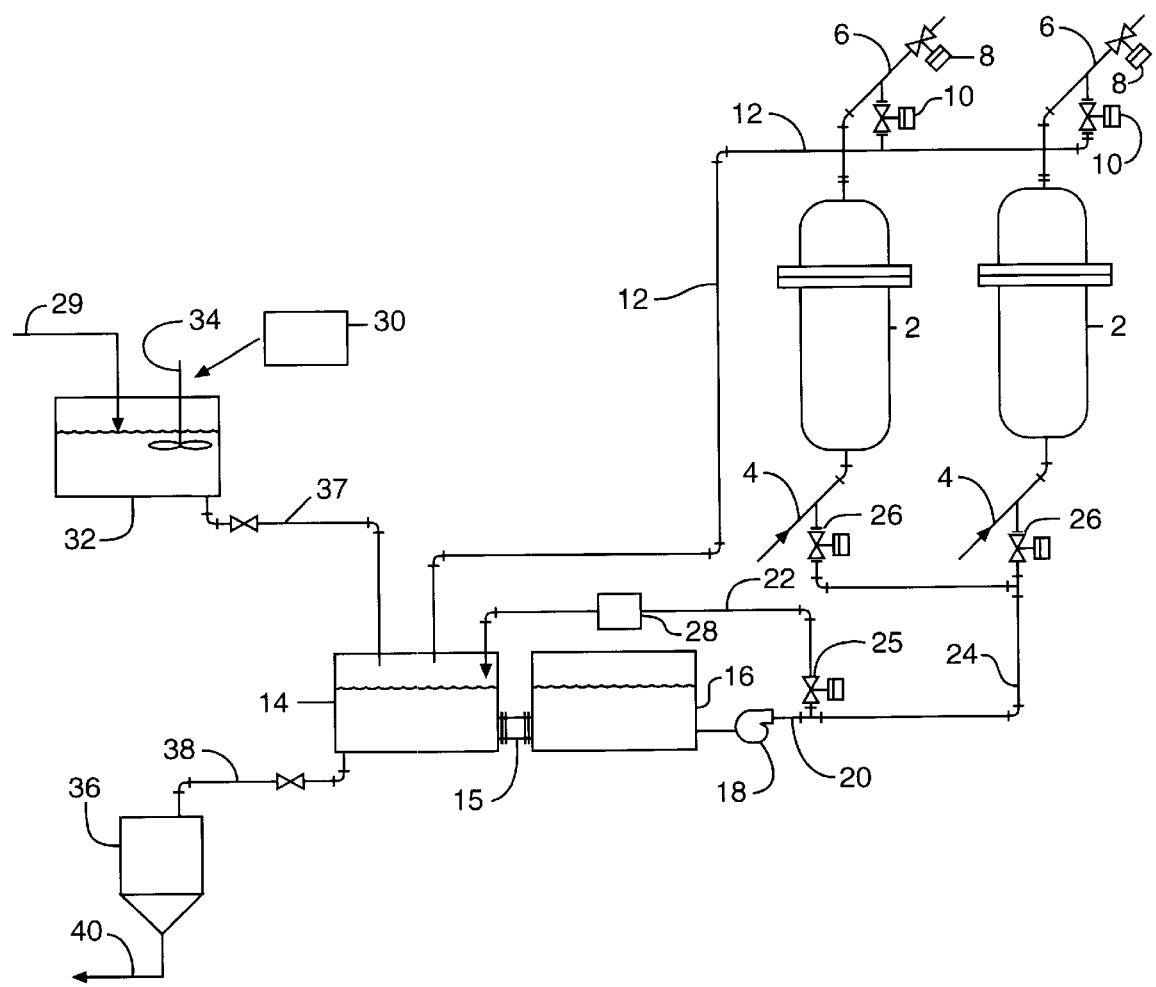
FIG. 1 shows an outline of the equipment used in the present invention.

This invention is a method for rejuvenating a filter that is used to remove metallic fines from lubricating fluids, both oil- and water based. Specifically, it is a process for removing fines when they are trapped in a filter so as to impede fluid flow through the filter. More specifically, the fines are filtered from aluminum rolling oil.

An example of the presently preferred process equipment is shown in FIG. 1. Rolling oil to be filtered is brought to filtration units 2 by line 4. Filtration units 2 contain multiple filtration cartridges through which the oil passes. In normal operation, the oil is sent back to its normal use via line 6. However, when the present process is being carried out, valves 8 are shut and valves 10 are opened to allow cycling of the acid solution that cleans the filters 2.

The acid solution is brought from tank 16 and is pumped to the filter units 2 by a suitable means, such as a mechanical pump 18. The pump preferably moves about 300 GPM@ 140' TDH (20 horsepower). Line 20 is split to recycle and heat the solution via line 22. Alternatively, the acid solution can be sent directly to the filtration units 2 by line 24. Valve 25 can control the direction of the acid solution. Appropriate valves 26 establish or diminish fluid contact to the filtration units 2. The acid solution can be heated by heater 28, which preferably uses steam.

Once the acid solution is passed through the filters 2 it flows through line 12 and back into an acid containment tank 14. Another tank 16 allows flexibility in storing and mixing the acid solution. Each tank 14, 16 preferably holds enough volume of acid solution to fill the filter units a number of times before requiring dumping. The tanks 14, 16 are in fluid communication through line 15.

The acid solution can be made by mixing water from line 29 with the acid from tank 30, either in solid or liquid form, in tank 32, using mixer 34. Thereafter, the acid solution is sent through line 37 to the acid containment tank 14. After the acid solution has been used enough times to render it unusable, it can be sent to a waste separation tank 36 through line 38 and thereafter to waste treatment through line 40.

The Filter

It should be understood that the term "filter", as used herein, refers to the medium used to remove solid particulates from the lubricating fluid used in the rolling stands. It can include many types of filtration media, such as steel mesh, fibers or other means to remove small particulates from a fluid stream.

The preferred filtration units 2 contain about 600 depth type cartridge filters. These cartridges are typically cylinders with a hollow core with walls of about three-eight's of an inch in thickness. Preferably, they comprise a mandrel, having openings for fluid passage, an inner filter and an outer filter.

The mandrel can be made of stainless steel cylinder that has fluid passage from the inner part of the cylinder to the outer. An inner filter is preferably wrapped around the mandrel. Generally, materials such as metals, glass, polymers, papers, or the like are used as a filter medium. These filter media can be provided in many forms, such as a woven or non-woven fabric, or a porous member formed from sintered or bound particles. Specific examples of inner filter media include polymers, such as polyester, polyamide, polyvinyl chloride or polyacrylonitrile; or polyolefins such as polyethylene or polypropylene. Methods for manufacturing the inner filter media material into an appropriate porous structure are conventional and well-known to those skilled in the art. Some example polymers are commercially available from E.I. Du Pont de Nemours and Company (Du Pont) under the trademark TEFLON® PFA, for PFA; TEFZEL®, for ETFE; TEFLON® TFE, for PTFE; and TEFLON® FEP, for FEP, respectively. Other PTFE films suitable for modification for use in the present invention are commercially available and for example may be purchased from Chemical Fabrics Corporation under the trademark Chemfilm TM MR cast PTFE film. The inner filter can be cut to an appropriate length and wound around a mandrel by automated machinery into a multilayer tubular form.

An outer filter is preferably disposed around the inner filter media. The outer filter is preferably stainless steel mesh. Preferably, the density (porosity) of the outer filter media is uniform and is significantly less (more porous) than the density of the inner filter media. As an example, the density of the inner filter media might vary from about 5 $\mu$m at the inside diameter to 75 $\mu$m at the outside diameter, while the density of the outer filter media layer might be at least 125 $\mu$m. The outer filter media thereby is designed to act as a pre-filter for the inner filter media. As with the inner filter media, the density of the outer filter media can be chosen depending upon the particular application. Preferably, the outer filter media is wound in a helical or spiral fashion in a single layer along the length of the cartridge. See U.S. Pat. No. 5,039,413 which is hereby incorporated by reference in its entirety.

Stainless steel filters include stainless steel in the form of sheets of woven or non-woven fabric, a sintered metal formed by sintering minute particles of stainless steel, and the like. They are provided as sheets, cylinders, or units with a large filtration area formed by providing ribs in the axial direction of the cylinder. In addition, a unit made from layered fabrics with a number of fiber sheets having apertures with different sizes or a very thick filter medium can be utilized to improve filtering performance or resistance to filtering pressure. An example of a porous metal tube is the S Series PSS®, a porous stainless steel filter element sold by Pall Corporation.

Filters shown in U.S. Pat. Nos. 5,122,270; 5,639,370; 5,476,585; 5,605,625; 5,591,335; 3,347,391; 4,661,132; 5,269,921; 3,450,632; 4,240,864; 5,340,479; 4,731,184; 4,629,474; 3,399,516; 4,111,815; and 3,347,391 are exemplary of some of the above structures and are hereby incorporated by reference in their entireties.

The preferred filter assembly also comprises end caps. Each of the axial ends of the filter element are sealed to an end cap, which is formed as a unitary, one-piece structure. The end caps are secured to the filter element by conventional attachment techniques, e.g., gluing, ultrasonic welding, fusion bonding, friction (spin) welding, etc. The particular method is selected based on the characteristics of the materials employed. The result is (1) a leak-proof seal between the end cap and the filter element to prevent bypass of unfiltered fluid and contamination the filtered fluid (filtrate) and (2) a filter element which is supported by the core against radially and axially directed forces.

The dimensions of the filter cartridge (inner and outer diameter, length, etc.) can vary depending upon the particular application as should be apparent to those skilled in the art upon reading the following description of the invention.

The Lubricant

It is contemplated that the present process be employed to rejuvenate filters that remove fines from various oil/water mixtures. More specifically, these mixtures are fluids that are used in the metal processing industry, preferably the aluminum industry. More specifically, it is contemplated that the process is applied to the rejuvenation of filters that are used to remove fines from rolling oils used in aluminum hot- or cold-rolling plants. These metalworking fluids can be called rolling oils, lubricants or coolants.

It is well-known that non-soluble oils such as straight mineral, i.e., without an emulsifier, or fatty oils are not completely satisfactory for the working of metals from the standpoint of cooling ability. Thus, emulsion-type lubricants based on mineral or fatty oils have been used conventionally for plastic deformation processes in which a high cooling ability is required in, for example, the hot rolling of aluminum, the manufacturing of aluminum cans by a drawing and ironing process, the cold rolling of steel and so forth. These conventional emulsions contain as an emulsifier, anionic surfactants such as petroleum sulfonates, resin soaps, fatty acid soaps, etc., or nonionic surfactants such as sorbitan alkyl esters, polyoxyethylene sorbitan alkyl esters, etc., having a good cooling ability. Conventional water-soluble lubricating compositions for metal working are disclosed in, for example, U.S. Pat. Nos. 3,492,232, 3,496, 104, 3,634,245, and are hereby incorporated by reference in their entireties.

The oil-soluble nonionic surfactants, may, in special cases, function as a load-bearing additive. Since oil-soluble surfactants cannot be dissolved in water by themselves, water-soluble nonionic surfactants are indispensable as a solubilizer. Since the phosphate esters (and/or their salts) and/or fatty acid soaps employed in the water-soluble lubricants of the present invention are highly surface-active and have a fairly strong affinity for oil-soluble surfactants, they function to associate with the fines that are present in the fluids.

In some cases the lubricants used to roll aluminum are water-soluble and are used by dilution with water, forming transparent or semi-transparent solutions. Since the solutions are single-phase and highly surface-active, they show improved stability, improved cooling ability, excellent uniform lubrication and increased bite of the rolls. The metal working lubricants typically include nonionic surfactants, oil-soluble nonionic surfactants and phosphate esters and/or salts of fatty acids and are used by dilution with water. When diluted, the lubricants of the present invention can further be combined with water-soluble solvents, such as glycols, glycol ethers and so forth, e.g., in an amount of up to about 20% by weight based on the total weight of the composition. These solvents provide the lubricants with better solubility. Preferred solvents are ethylene glycol, polyethylene glycols having a molecular weight of less than about 600, alkylene glycols having less than about 6 carbon atoms, glycol ethers of lower alcohols having less than about 4 carbon atoms and lower alkanolamines. Additionally, mineral or fatty acids can be combined with the lubricants of the present invention to adjust lubricity, to the extent that the water-solubility is not lost, e.g., in an amount of up to about 20% by weight based on the total weight of the composition.

The nonionic surfactants can include polyoxyalkylene glycol esters of fatty acids, polyoxyalkylene glycol ethers of fatty alcohols, polyoxyalkylene glycol ethers of fatty alcohols esterified with fatty acids and polyoxyalkylene glycol condensates of glycerides esterified with fatty acids. The compositions can be considerably varied in proportion: about 10 to 60% by weight of water-soluble nonionic surfactants, about 10 to 40% by weight of water-insoluble (or oil-soluble) nonionic surfactants and about 10 to 50% by weight of the phosphate esters or fatty acid salts.

The Process

In service, unfiltered fluid, i.e. rolling oil, is directed through the filter element where the filter medium blocks, entrains, traps and/or otherwise removes the fines from the unfiltered fluid to provide a filtrate. Over time, the fines foul the filter, causing an unacceptable increased pressure differential (pressure drop) across the filter element. When the pressure drop becomes substantial, the element is backwashed with air to dislodge the contaminates from the filter medium. If the backwash process fails to clean the filter medium adequately, the filter medium will foul more rapidly than the previous filtering cycle. If the backwash cycle continues to fail to clean the filter medium, then the filtering times continue to decrease until the filtering times become impracticable. The present invention is required to properly clean contaminants from the filter medium and prevent degradation of filtering time.

More specifically, the present filter has an absolute pore rating of about 40 micrometers or less, i.e., from about 0.1 to about 40 micrometers, preferably from about 0.5 to about 30 micrometers, more preferably from about 5 to about 15 micrometers. The rolling oil is passed through the filter at a flow density of from about 0.05 to about 0.5 gallons per minute per square foot of filter surface such that initially at least a portion of the solid particulates is collected on the upstream surface of the surface filter and begins forming a filter cake. Whereby a clearer effluent, reasonably free of particulates having particle sizes in the range of from about 0.1 to about 30 micrometers or higher is obtained. Thereafter, the cake is removed from the from the filter medium preferably using compressed air at 80 psi to dislodge and flush the contaminants from the filter units 2 to the waste separation tank 36.

If a filter is reused which has not been adequately rejuvenated, the filter will achieve the terminal differential pressure more rapidly. The filter exchange cycle must therefore be shortened, and the works involved in the exchange and regeneration of filter media are very troublesome. In many cases, the filter medium must be discarded after only several uses, and in extreme cases, the filter medium is discarded without a reuse, resulting in a great increase in production costs.

Preferably, the process of the subject invention is carried out at flow rates in the range of from about 0.05 to about 0.3 gallons per minute per square foot of filter surface using a plurality of filter cartridges. Typically, by this invention the filter medium can be restored to a clean condition, such that the filtering times are not substantially diminished on subsequent filtering cycles. The useful life of depth filter cartridges without the present process can be as short as 2 minutes or less with effluent loadings of 20 to 30 percent of the influent loading, when operating at comparable influent loadings of, for example, 600 ppm.

The present process contacts fines and their organo-metallic coatings with aqueous solutions of strong acids to solve the problems of plugged cartridge type filters. The preferred process employs a washing step whereby, following a filter cycle that is terminated due to a pressure build-up, a hot aqueous solution of a strong acid with a pH of approximately 1.5, is circulated through the plugged filter cartridges until the fines and organo-metallic coatings are solubilized. The acid wash solution is kept separate from the filter feedstock and filtrate by suitable valving, piping and tankage so as not to contaminate the rolling oil. The filter cartridges are preferably rinsed prior to reintroduction of the feed stock to begin the next filter cycle. Water is a typical rinse medium, but other liquids could be used.

Acids that can be used in the present invention preferably include sulfuric, hydrochloric, nitric, acetic, citric, hydroflouric, hydrobromic, and phosphoric. Sulfuric, phosphoric, and hydrochloric are more preferred, and sulfuric is most preferred. When sulfuric acid is used, it is preferred to add it as sodium bisulfate, a solid. The preferred pH is 0.5 to 2.5, more preferably 1 to 2, most preferably about 1.5. A pH above 2.5 can be employed, however, the time that the acid needs to be in contact with the filter is longer.

The acid solution is pumped through the filters as shown in FIG. 1 and described above. The cycle time is at least 10 minutes. More preferably, it is at least 30 minutes. The acid washing is continued until the effluent is substantially clear of fines and the filters are rejuvenated. Preferably, the process lasts no more than two hours, more preferably, no more than 1 hour. Obviously, the time to clear the filter is variable, as it depends on the acid strength, temperature of the acid wash, and flow rate, etc. The acid wash solution can be reused until it is too contaminated with fines, oil, or when the pH increases to an unacceptably high level. Typically, the solution will last for more than one rejuvenation cycle.

The acid solution is heated to a temperature between 100 and 200° F., more preferably between 125 and 200° F., most preferably between about 150° F. and 200° F. Preferably the acid solution is steam heated, however, other heating methods may be used.

The process is begun when the differential pressure increases across the filter. The increase is dependent on the filter type, the number of filters, etc. However, care is taken not to allow the pressure to force the fines too far into the filter so that they cannot be removed. The preferred pressure drop across the filter after rejuvenation is between 10 and 100 psi, more preferably between 10 and 30 psi, most preferably between 10 and 20 psi.

It will be understood that various changes and modifications can be made in the details of construction and use without departing from the spirit of the invention, especially as defined in the following claims.

We claim:

1. A process for improving the flow through of filter elements that are used to filter aluminum rolling oil and have been contaminated with aluminum fines that are complexed with soaps, the process comprises, heating an acid wash solution to a temperature between 100 and 200° F.;

pumping the hot acid wash solution through the filter elements for at least 10 minutes.

2. A process in accordance with claim 1 wherein the acid wash solution has a pH of between 0.5 to 2.5, the acid wash solution containing one or more of the following acids selected from the group consisting of sulfuric, hydrochloric, nitric, acetic, citric, hydroflouric, hydrobromic, and phosphoric acids.

3. A process in accordance with claim 2 further comprising:

ceasing fluid communication between the rolling oil and the filter elements before the hot acid wash solution is pumped through the filter elements;

shutting off fluid communication between the acid wash solution and the filter elements after the hot acid wash solution is pumped through the filter elements; and thereafter reestablishing fluid communication between the filter elements and the rolling oil.

4. A process in accordance with claim 1 wherein the acid wash solution is contacted with the filter elements for more than 30 minutes.

5. A process in accordance with claim 1 wherein the acid wash solution has a pH between 1 and 2.

6. A process in accordance with claim 1 wherein the acid wash solution is contacted with the filter elements at a pressure of between 10 and 100 psi.

7. A process in accordance with claim 1 wherein the acid wash solution is contacted with the filter elements at a pressure of between 10 and 30 psi.

8. A process in accordance with claim 1 wherein the filter elements have a pore rating of about 40 micrometers or less.

9. A process in accordance with claim 1 wherein the filter elements have a pore rating of between 0.5 and 30 micrometers.

10. A process in accordance with claim 1 wherein the filter elements are contacted with the acid wash solution for at least 10 minutes.

11. A process in accordance with claim 1 wherein the filter elements are contacted with the acid wash solution at a flow rate of between 0.05 to 0.3 gallons per minute per square foot.

12. A process for rejuvenating a series of filters that have been clogged due to their contact with rolling oil used in aluminum sheet fabrication, comprising (a) preparing a solution of sulfuric acid having a pH between 1 and 2 by mixing water with solid sodium bisulfate;

(b) heating the sulfuric acid solution to between 150° F. and 200° F. using steam heat;

(c) contacting the solution with said series of filters having aluminum particles therein, which are creating an unacceptable pressure differential across the filter, the contact lasting between 30 and 45 minutes through a recycle of the sulfuric acid solution.

13. A process for improving the flow through of filter elements, having pores of about 40 micrometers or less, the filter elements are used to filter aluminum rolling oil, and have been contaminated with aluminum fines that are complexed with soaps, the process comprises, shutting off the filter elements from the normal flow path of rolling oil and proving fluid communication with an acid wash solution having a pH of between 0.5 to 2.5, the acid wash solution containing one or more of the following acids selected from the group consisting of sulfuric, hydrochloric, nitric, acetic, citric, hydroflouric, hydrobromic, and phosphoric acids;

heating the acid wash solution to a temperature between 125 and 200° F.;

pumping the hot acid wash solution through the filter elements for at least 30 minutes;

ceasing the contact and shutting off fluid communication between the acid wash solution and the filter elements; and reestablishing fluid communication between the filter elements and the rolling oil.

14. A process in accordance with claim 13 wherein the pH of the acid solution is between 1 and 2.

15. A process in accordance with claim 13 wherein the acid is selected from the group consisting of sulfuric, hydrochloric, and phosphoric.

16. A process in accordance with claim 13 wherein the acid solution is heated to between 150 and 200° F.

17. A process in accordance with claim 13 wherein the acid wash solution is contacted with the filter elements at a pressure of between 10 and 100 psi.

18. A process in accordance with claim 13 wherein the filter elements are washed with an aqueous solution to remove any remaining acid solution.

* * * * *